Jan. 21, 1958 R. C. GORDON, JR 2,820,804
METHOD OF DEFATTING BACON SKINS
Filed April 6, 1955
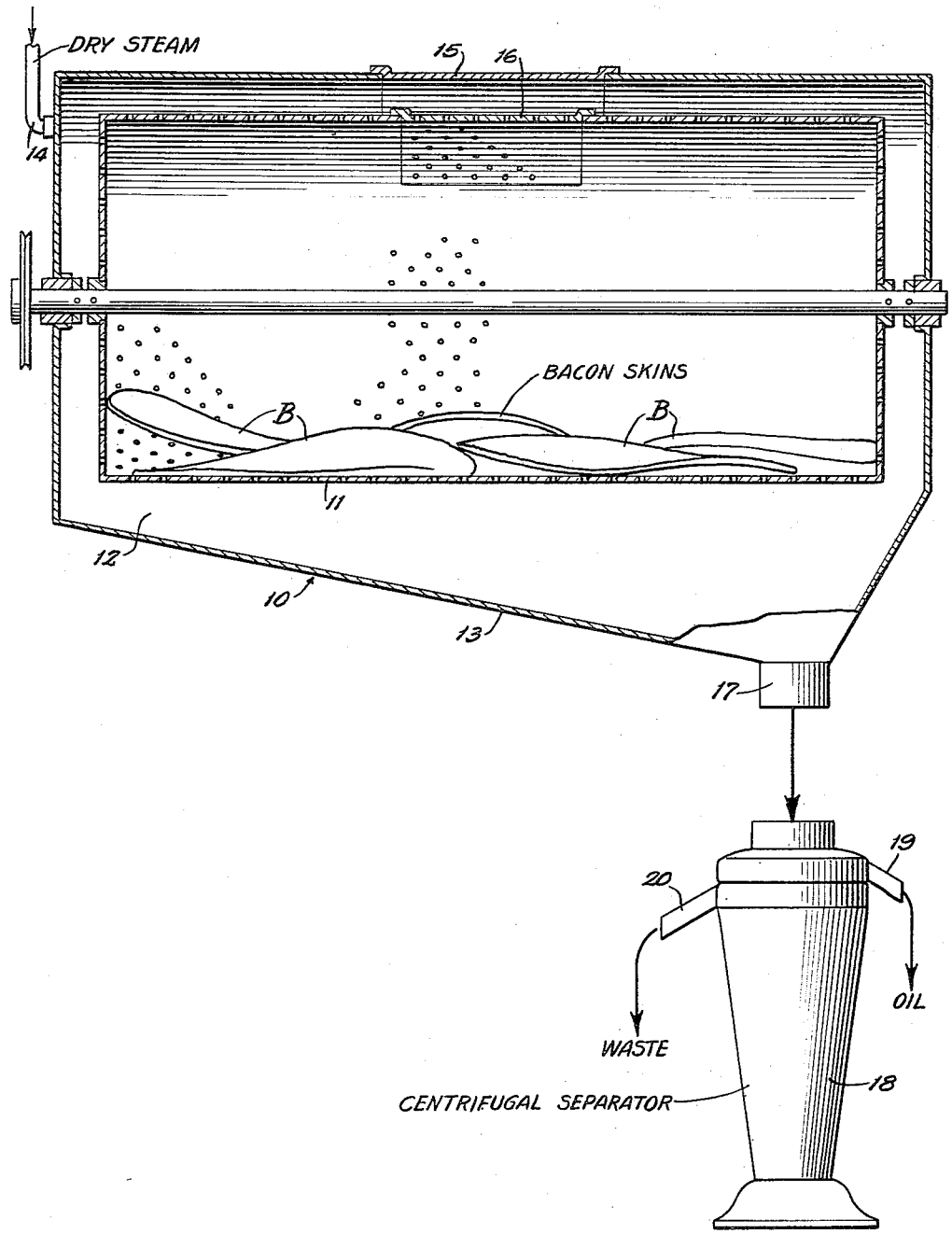
INVENTOR:
Roy C. Gordon, Jr.
BY
Carl C. Batz
ATTORNEY.

United States Patent Office 2,820,804
Patented Jan. 21, 1958

2,820,804

METHOD OF DEFATTING BACON SKINS

Roy C. Gordon, Jr., Oak Lawn, Ill., assignor to Armour and Company, Chicago, Ill., a corporation of Illinois Application April 6, 1955, Serial No. 499,587

10 Claims. (Cl. 260—412.6)

This invention relates to a method of defatting bacon skins. It also relates to the recovery of fat from bacon skins and to the conditioning of the bacon skins for the preparation of glue.

Bacon skins are a waste material which is obtained in considerable quantity in the processing of bacon. The skin portion or layer is separated from the bacon slab after smoking and salt-curing. While such bacon skins are not completely uniform, they usually contain from about 35 to 45% fat, 40 to 50% collagen, and 5 to 15% of inorganic salts (mostly sodium chloride). A typical analysis of bacon skins may be, as follows: 30% glue solids, 45% fat, 15% moisture, 5% inorganic salts and 5% tankage. Since the tankage constituent of the bacon skins is mainly proteinaceous, the protein content thereof may be calculated as 35%, i. e. total of tankage and glue solids concentration. Therefore, bacon skins are a potential source of both fat and glue, and their relative abundance and cheapness makes them an attractive source for these products. However, at present there is no fully satisfactory method for processing bacon skins to obtain fat and/or glue therefrom.

The separation of the fat from bacon skins has given particular difficulty, since neither the conventional dry or wet rendering processes produce good results. When the bacon skins are subjected to dry rendering for recovering the fat, the prolonged heating which is necessary for thoroughly defatting the bacon skins causes the collagen therein to deteriorate so that high quality glue cannot be subsequently produced from the defatted bacon skins. On the other hand, wet rendering of bacon skins causes a conversion of the collagen to glue during the rendering operation with the result that the product obtained is an emulsified mixture of fat, glue and water containing dissolved inorganic salts. It has been found to be difficult to separate the fat from such an emulsion, and to obtain the fat free of contaminating salts.

It is therefore an object of this invention to provide a method for defatting bacon skins and recovering the fat therefrom which substantially overcomes the problems and difficulties discussed above. More specifically, it is an object to provide a method for defatting bacon skins whereby substantially all of the fat therein can be removed without deteriorating the collagen therein or converting it to glue. Still another object is to provide a method of the character described wherein the mixture obtained in the rendering operation is mostly fat in a non-emulsified and readily separable form. Another object is to provide a method for defatting bacon skins and at the same time conditioning the bacon skins for the production of glue. Further objects and advantages will appear as the specification proceeds.

In practicing the present invention, bacon skins of the character described above are preferably employed. It is not necessary to reduce the inorganic salt content of the bacon skins prior to the recovery of the fat therefrom by the method of this invention. In fact, the method of this invention utilizes and takes advantage of this salt content in a highly advantageous way, as will subsequently be described. However, most of the advantages of this invention can be obtained providing the salt content of the bacon skins is at least 1% and preferably 3% by weight. Since the salt content of bacon skins is usually in the range from 5 to 15% by weight, it follows that some reduction in salt content would be possible while still following the method of this invention.

In the previous methods of defatting bacon skins, it has been the practice to hash or comminute the bacon skins to a relatively small particle size on the theory that this exposed a greater surface area and thereby facilitated the rendering operation. The present method, however, permits the use of bacon skins in the form in which they are obtained commercially, that is, in the form of sheets averaging 12 inches wide by 18 inches long. The use of the bacon skins in large size pieces not only avoids a hashing or grinding step, but facilitates subsequent handling and processing of the defatted bacon skins. It has also been found that the oil appears to separate more readily from the large size pieces and that the pieces themselves undergo a differential change of proportions which causes them to curl up and at the same time exert a squeezing action on the fat cells which promotes the expulsion of the liquefied fat. Also, the comminuted bacon skins have a tendency to form an emulsion upon contact with moisture with consequent entrapment of the fat therein. I have found that the utilization of large pieces of bacon skin in this process inhibits the formation of an emulsion thereby resulting in a larger amount of fat being separated. These advantages can be generally achieved with bacon skin fragments having an area of more than about 1 square inch. However, it is preferred that the bacon skin pieces have an average area of at least 4 to 6 square inches, such as pieces having dimensions of at least about 2 inches by 3 inches, and, as mentioned hereinbefore, the bacon skins may be suitably employed in the form in which they are obtained commercially, i. e. having average dimensions of 12 by 18 inches or an area of about 216 square inches. I have found that bacon skins have an average thickness of about $3/16$ inch, and upon swelling the thickness thereof may be increased to a maximum of about $5/16$ inch.

In accordance with this invention, bacon skins of the size and character described are subjected to mechanical agitation in an atmosphere of dry steam to melt and expel the fat therein without converting the collagen to glue. The direct contacting of the bacon skins with dry steam is important for achieving the objects of this invention, since wet steam, that is, steam containing substantial quantities of water in the liquid phase, tends to form an emulsion with comminuted bacon skin pieces with the consequent entrapment of fat therein. For the purpose of this invention, dry steam can be defined as steam having a quality of at least about 95%, i. e. steam containing less than about 5% by weight of moisture in liquid phase. However, more satisfactory results are achieved with steam having a quality of at least 97 to 98%. The steam employed can be dried or rendered free of water in the liquid phase by any suitable means, such as passing the steam through a centrifugal separator, etc.

Also, the steam may be dried at a superatmospheric pressure, e. g. 80 p. s. i. g., and then expanded at atmospheric pressure in this process. The expansion of the superatmospheric pressurized steam may result in superheating, but I have found that this superheating does not measurably interfere with the advantages of this invention. On the other hand, steam which has been dried at atmospheric pressure is suitable for employment in this process.

It is also of importance that the bacon skins should be treated with the dry steam under temperature conditions such that the steam does not tend to condense, but instead remains in the vapor phase. When operating at atmospheric pressure as preferred, this means that a temperature of at least 100° C. should be maintained in the treating zone and that the bacon skins themselves should be brought to this temperature and held there during the defatting operation. Higher temperatures than 100° C. can also be used. Since the bacon skins themselves contain water, it is of course impossible to completely avoid the contacting of the fat and collagen in the bacon skins with water in the liquid phase, but the degree of contact can be kept sufficiently low by the use of dry steam to accomplish the desired result of preventing the collagen from being converted to glue, providing the bacon skins contain at least 1 and preferably at least 3% by weight of inorganic salts. Apparently the inorganic salts act to inhibit the hydrolysis of the collagen in bacon skins which normally precedes the conversion of the collagen to glue.

The method of mechanical agitation is not critical, although it has been found advantageous to subject the bacon skins to a tumbling-over movement while being contacted with the dry steam. When this is carried out in a perforated drum as preferred, the melted and expelled fat can be continuously removed until the bacon skins are substantially free of fat without hydrolyzing the collagen to the glue stage. Further, the product obtained will consist mostly of fat and the amount of water mixed with the fat will usually not exceed 25%. Since the collagen is not converted to glue, there will be substantially no glue in the oil and water mixture, and the oil in the mixture will be in an unemulsified, readily separable form. As a further step in the recovery of the fat from the bacon skins, it can be separated from the water in this mixture by any suitable procedure such as decanting or centrifugation.

An embodiment of the method just described is illustrated in the accompanying diagrammatic flow sheet. This flow sheet shows a jacketed treating drum 10 having an inner perforated cylinder 11 mounted for rotation within chamber 12 provided by outer casing 13. Any suitable means (not shown) is provided for slowly rotating cylinder 11. A suitable means is also provided, as indicated at 14, for admitting dry steam into chamber 12, and outer casing 13 and cylinder 11 are respectively provided with doors 15 and 16 for the introduction and removal of bacon skins.

As indicated, the bacon skins are charged to cylinder 11 and treated therein with dry steam while the cylinder is rotating. Initially, a small amount of the dry steam may condense on the bacon skins as they are brought up to a temperature of at least 100° C., but in a few minutes this condensation will substantially cease. Then for a period of from 15 to 30 minutes the bacon skins will be tumbled in the atmosphere of dry steam to melt and expel the fat therein. The liquefied fat will continuously drain out through the perforations in cylinder 11 and pass out from chamber 12 through outlet 17. The material discharged through outlet 17 is then passed to a centrifugal separator 18, and after passing therethrough is discharged at 19. The oil product thus obtained will be of high quality and will have a clear, amber color. Any water or solids discharged with the oil from treating drum 10 will be removed therefrom in separator 18 and discharged to waste at 20. As indicated above, except during the initial heating phase, there will be relatively little water in the mixture discharged from outlet 17 and passed to centrifugal separator 18. Further, at no time will the oil and water in the mixture be emulsified to any appreciable extent.

During the treating period the bacon skins will tend to curl up, and when removed from treating drum 10 after the completion of the defatting operation, they will have a coiled or rolled appearance. These bacon skins will be substantially fat free, and will visually appear to be entirely free of fat. Any oil or fat clinging to the surface of the bacon skins can readily be removed by washing them with a small amount of warm water; and if desired this wash can be passed through centrifugal separator 18 to recover any fat therein. The curled bacon skins will appear somewhat swelled and the skins will feel soft and spongy. They will be well prepared for conversion to glue or gelatin by any process.

This invention is further illustrated by the following specific examples.

Example I

The rotating drum apparatus described in the accompanying drawing was employed in separating fat from bacon skins by the following method:

Bacon skin pieces having an average dimension of about 12 by 18 inches were charged into the perforated drum portion of the apparatus. The total weight of these bacon skin pieces was 110 lbs. Dry steam of a quality of about 98% was injected into the outer drum chamber for a period of 30 minutes at atmospheric pressure. The drum was rotated on its horizontal axis during this period, while the temperature was maintained at about 210° C.

The fat exuded from the bacon skin pieces during this operation was drained continuously through the passages in the drum and into a vertically mounted Sharples centrifuge. In this centrifuge, the fat was separated from waste liquid. The fat was obtained in a yield of 39.6 lbs., i. e. 36% of the weight of bacon skin pieces.

This fat, which had a clear, amber color, was analyzed, and the results thereof were as follows:

Free fatty acid (titration with sodium hydroxide in alcohol) _____ 0.89%.
Color (Lovibond method) _____ 35 yellow, 4.2 red.
Melting point (Wiley method) _____ 31.1° C.
Stability (A. O. M. method—bubbling oxygen through fat while heating) ____ 2 hours.

The bacon skin pieces were removed from the drum, and visually appeared to be free of fat. These skins had swelled, and were soft and spongy.

A sample of these bacon skin pieces was analysed and found to contain about 12% of fat on a dry basis. Thus, about 91% of the fat originally contained in the bacon was separated in this process. A greater degree of fat separation could have been obtained, for example, by prolonging the exposure time of the bacon skins to the dry steam.

Example II

Defatted bacon skins obtained according to the method of Example I were subjected to glue extraction, as follows:

These bacon skin pieces were alternatively soaked in cold and hot water for a total of 3 changes. This removed fat remaining in the tissue together with residual inorganic salts.

The soaked bacon skins were charged into the rotating drum shown in the accompanying drawings. Wet steam was continuously injected into the drum chamber for a period of 5 hours, while the drum was undergoing constant rotation. The steam pressure was gradually increased to a maximum of 25 p. s. i. g. during the run, and the rate of water injected with the steam was increased from 7.5 to 733 cc. per minute in the same period.

The glue liquor thereby produced was continuously drained through the drum passages and collected.

This glue liquor was obtained in a yield of 422 lbs. The liquor was analysed and found to contain 7.5% of solids on a dry basis.

The glue yield from the bacon skins was calculated as 28.6%, while the residual bacon skin tissue represented 6.1% of the bacon skin weight. This tissue residue was utilized as tankage.

While in the foregoing specification this invention has been described in relation of a specific embodiment thereof, and many details have been set forth for purpose of illustration, it will be apparent to those skilled in the art that the invention is susceptible to other embodiments and that many of the details set forth herein can be varied widely without departing from the basic concepts of the invention.

I claim:

1. The method of defatting bacon skins characterized by the step of subjecting the bacon skins to mechanical agitation in an atmosphere of dry steam at a temperature of at least 100° C. to melt and expel the fat therein without converting the collagen to glue.

2. The method of recovering fat from bacon skins and conditioning the bacon skins for the recovery of glue, comprising treating bacon skins by subjecting the bacon skins to mechanical agitation in an atmosphere of dry steam at a temperature of at least 100° C., continuing said treatment until the bulk of the fat in said skins is melted and expelled, and separating the expelled fat from the bacon skins as a liquid mixture, said liquid mixture containing only a small amount of water relative to the fat therein and being substantially free of glue.

3. The method of defatting bacon skins containing at least 3% by weight of inorganic salts, comprising tumbling said bacon skins in an atmosphere of dry steam at a temperature of at least 100° C. to form a liquid phase composed principally of fat and a minor proportion of water, and continuously removing said liquid phase from the bacon skins until said bacon skins are substantially free of fat, the oil in said liquid phase being in a readily separable non-emulsified state.

4. The method of treating bacon skins, comprising mechanically agitating a plurality of bacon skin pieces while contacting said pieces with dry steam, said pieces containing at least 3% inorganic salts and being at least 3 inches long by 2 inches wide, continuing said mechanical agitation in said contact with dry steam at a temperature of at least 100° C. until the bulk of the fat is expelled from said pieces without any substantial amount of glue being expelled therefrom.

5. The method of defatting bacon skins, comprising tumbling a plurality of bacon skin pieces in an atmosphere of dry steam at a temperature of at least 100° C. to form a liquid phase composed principally of fat and a minor proportion of water, said bacon skin pieces initially containing at least 3% inorganic salts and being on the average at least 2 inches wide by 3 inches long, and continuously removing said liquid phase from the bacon skins until said bacon skins are substantially free of fat, the oil in said liquid phase being in a readily separable non-emulsified state and said liquid phase being substantially free of glue.

6. The method of defatting bacon skins containing inorganic curing salts, which comprises tumbling bacon skin pieces having an average area of at least about 1 square inch in an atmosphere of dry steam at a temperature of at least 100° C. to form a liquid phase composed principally of fat and a minor proportion of water, and continuously separating said liquid phase from the bacon skin pieces until said bacon skin pieces are substantially free of fat.

7. The method of defatting bacon skins containing inorganic curing salts, which comprises tumbling bacon skins in an atmosphere of dry steam at a temperature of at least 100° C. to form a liquid phase composed principally of fat and a minor proportion of water, continuously separating said liquid phase from the bacon skins, continuously removing said liquid phase from the atmosphere of dry steam, and then separating the fat in said liquid phase from the water therein.

8. The method of defatting bacon skin pieces, which comprises tumbling bacon skin pieces having an average area of at least 4 to 6 square inches in an atmosphere of dry steam at a temperature of at least about 100° C. to form a liquid phase composed principally of fat and a minor proportion of water, said bacon skin pieces containing an average of at least 3% by weight of inorganic salts, continuously separating said liquid phase from the bacon skin pieces, and continuously removing said liquid phase from the atmosphere of dry steam.

9. The method of defatting bacon skins, which comprises tumbling substantially intact bacon skins in an atmosphere of dry steam at a temperature of at least 100° C. to form a liquid phase composed principally of fat and a minor proportion of water, said bacon skins containing an average of 5 to 15% by weight of inorganic salts, continuously separating said liquid phase from the bacon skins, and continuously removing said liquid phase from the atmosphere of dry steam.

10. The method of treating bacon skins containing inorganic curing salts, which comprise tumbling substantially intact bacon skin pieces to an atmosphere of dry steam at a temperature of at least 100° C. to form a liquid phase composed principally of fat and a minor proportion of water, said bacon skins containing said inorganic curing salts in substantially undiluted form when initially subjected to the atmosphere of dry steam, continuously separating said liquid phase from the bacon skins, continuously removing the liquid phase from the atmosphere of dry steam, then separating the fat in said liquid phase from the water therein, and subjecting the separated bacon skins to glue extraction.

References Cited in the file of this patent

UNITED STATES PATENTS

| Re. 5,195 | Broadnax | Dec. 24, 1872 |
| 295,184 | Lissagaray et al. | Mar. 18, 1884 |
| 668,210 | Powter | Feb. 19, 1901 |
| 1,833,826 | Cullen | Nov. 24, 1931 |
| 1,845,893 | Sommermeyer | Feb. 16, 1932 |
| 1,854,270 | McGilton | Apr. 19, 1932 |
| 2,179,616 | Darrow | Nov. 14, 1939 |
| 2,580,049 | Sifferd et al. | Dec. 25, 1951 |

FOREIGN PATENTS

| 470,223 | Great Britain | Aug. 11, 1937 |